United States Patent [19]

Söllner

[11] Patent Number: 4,466,474

[45] Date of Patent: Aug. 21, 1984

[54] DEVICE FOR ROTATING A SUNSHADE STRIP ENCLOSED IN AN EVACUATED GLASS TUBE

[75] Inventor: Gerhard Söllner, Aachen, Fed. Rep. of Germany

[73] Assignee: U.S. Philips Corporation, New York, N.Y.

[21] Appl. No.: 392,113

[22] Filed: Jun. 25, 1982

[30] Foreign Application Priority Data

Jul. 2, 1981 [DE] Fed. Rep. of Germany ....... 3126038

[51] Int. Cl.$^3$ .............................................. E06B 3/32
[52] U.S. Cl. .................................................... 160/107
[58] Field of Search ..................... 160/107; 49/84, 425; 52/304, 306, 307, 308; 126/432, 438, 443

[56] References Cited

U.S. PATENT DOCUMENTS

| | | | |
|---|---|---|---|
| 1,729,818 | 10/1929 | Burgess | 52/308 |
| 1,960,160 | 5/1934 | Louda | 52/308 |
| 3,012,294 | 12/1961 | Waldor | 49/84 |
| 4,038,797 | 8/1977 | Hermann et al. | 52/308 |
| 4,284,069 | 8/1981 | Hörster et al. | 126/438 |

Primary Examiner—Peter M. Caun
Attorney, Agent, or Firm—Rolf E. Schneider

[57] ABSTRACT

A thermally insulating transparent wall element comprises a plurality of paraxially, adjacently arranged evacuated transparent tubes each having an axially arranged shaft journalled therewithin, an elongate sunshade strip being mounted on each shaft. A ratchet wheel is supported on one end of each shaft and has at its circumference engaging elements situated at the same angular distance from one another. An externally operable pawl cooperates with the engaging elements of the ratchet wheel to advance the same in step-wise manner. Means is provided to drive the pawl; and a member is coupled to the pawl drive means for latching the ratchet wheel at the end of each movement step, such member being releasable from the ratchet wheel by the pawl drive means just before the start of the next movement step.

9 Claims, 6 Drawing Figures

DEVICE FOR ROTATING A SUNSHADE STRIP ENCLOSED IN AN EVACUATED GLASS TUBE

This invention relates to a device for the externally controlled rotation about its longitudinal axis of a sunshade strip which is enclosed in an evacuated glass tube of a thermally insulating, transparent wall element.

From U.S. Pat. No. 4,038,797 thermally insulating, transparent wall elements for walls or roofs of houses are known which consist of a plurality of evacuated glass tubes which are paraxially adjacently arranged and whose inner surface is covered with a heat-reflective layer, said glass tubes being covered on each side by means of a glass pane or a transparent plastic plate. In wall elements of this kind an adjustable sunshade is often desirable in order to control the ingress of light and heat radiation into the room situated therebehind. A sunshade of this kind can be realized by means of elongate sunshade strips which are respectively enclosed in the evacuated glass tubes and which are rotatable about their longitudinal axes as in the wall element in accordance with U.S. Pat. No. 4,284,069. The strips therein are provided with an infrared-reflective layer on one surface; these strips can at the same time serve as solar collectors.

Special requirements are imposed on the rotatable sunshade strips and their drive. It must be possible to place and retain the strips in many, defined positions. All strips of a wall element should occupy the same position at the end of each movement operation. Correction of individual strips which are out of step should be possible with simple means. All strips of a wall element should be drivable together with an energy consumption as low as possible. The mechanism for the rotary movement of the strips must preferably be so small that it can be accommodated, at one end of the tube inside the glass tube and outside the glass tube in the frame of the wall element. Moreover, the rotation mechanism and its mounting must be simple and inexpensive.

In the wall element in accordance with U.S. Pat. No. 4,284,069, the rotation of the strips enclosed in the evacuated glass tubes is performed by means of permanent magnet couplings. Because relatively substantial forces are required for the rotation of such strips, the rotation of the strips is not always synchronized with the rotary movement of the drive magnets situated outside the glass tubes. At the end of a rotary movement, therefore, the strips of a wall element my not all occupy the same position; this has an adverse effect on the functioning of the wall element.

Therefore, it is an object of the present invention to provide a device for the rotation of a sunshade strip enclosed in an evacuated glass tube such that the strip always performs an exactly predetermined angular rotation and retains its position even when the glass tube is subject to unintended influences, for example, in the form of shocks.

This object is achieved in that the strip is mounted on a shaft which is journalled inside the glass tube and one end of which supports a ratchet wheel which has on its circumference engaging elements which are situated at the same angular distance from one another, which ratchet wheel can be advanced step-wise at the end of each movement step by means of an externally operable pawl which co-operates with the engaging elements, the ratchet wheel being latched by a latching member which is coupled to the pawl drive and being released only when a further movement step is performed.

The ratchet wheel with its engaging elements and the pawl together form a kind of stepping system. During each movement step, the pawl co-operating with the engaging elements advances the ratchet wheel through the predetermined stepping angle. Subsequently, the pawl returns to its starting position without back-rotation of the ratchet wheel. Before and after the movement step, the ratchet wheel is blocked by a latching member. The latching member is coupled to the pawl drive so that it releases the ratchet wheel just before a new movement step and so that before completion of the movement step it is again ready to block the ratchet wheel.

The engaging elements may be, for example, bolts, hooks, recesses or holes in the ratchet wheel. However, preferably sawteeth are provided on the circumference of the ratchet wheel. For forward movement, the pawl then presses against a steep tooth flank of the ratchet wheel and subsequently slides back on the flat flank of the next tooth.

In a preferred embodiment of the device in accordance with the invention the pawl drive comprises relay with an armature which is arranged inside the glass tube and which may be spring-loaded and an excitation coil which is situated outside the glass tube, said armature being pivotally connected to the pawl by means of a lever. When the relay is excited by a current flowing through the excitation coil, the armature is pulled in the direction of the excitation coil, so that the pawl connected thereto via the lever is moved forwards, the ratchet wheel thus being advanced through the stepping angle. When the current is interrupted, the armature returns to its starting position and takes along the pawl. The excitation coil of the relay may be accommodated in the frame of the wall element.

In a further preferred embodiment of the device in accordance with the invention, the pawl is mounted on the free end of a bimetal strip which is arranged inside the glass tube and adjacent the ratchet wheel so as to be movable parallel thereto. When the bimetal strip is heated, it is bent in the forward direction of the ratchet wheel, thus advancing the ratchet wheel through the stepping angle by means of the pawl.

The bimetal strip can be heated by means of a heating winding which is arranged on the exterior of the glass tube. However, preferably direct electric heating is used for which the bimetal strip itself acts as a heating resistance. In that case electric power supply wires are connected to the metal strip, the wires being run out of the glass tube in a vacuum-tight manner for connection to a voltage source.

For the latching of the ratchet wheel, it is provided on its outer face with openings which are associated with the engaging elements and which are arranged in a circle around the longitudinal axis of the strip, a spring-loaded latching pin step-wise entering said openings, said latching pin being withdrawn from the relevant opening by the pawl drive, via a catch, before the start of the next movement step and being released again before the completion of the movement step. After being released, the latching pin is laterally pressed against the rotating ratchet wheel by means of a spring, the ratchet wheel thus sliding past the latching pin until the pin enters the next opening at the end of the rotary movement through the stepping angle, the ratchet wheel thus being again latched.

When use is made of a relay comprising an armature the latching pin is preferably pivotally journalled and its catch end which is remote from the ratchet wheel engages in a recess in the armature in a latching manner. When the armature is attracted by the excitation coil of the relay, it withdraws the latching pin from the ratchet wheel via the catch end. Before completion of the pivoting motion of the armature, and hence the rotation of the ratchet wheel, the catch end emerges from the armature recess and the latching pin is laterally biased against the ratchet wheel again.

When the device comprises a bimetal strip, a leaf spring whose end is bent so as to be sawtooth-shaped may be provided at the other end of the strip, the wide surface of said leaf spring moving parallel to the outer face of the ratchet wheel, thus pulling the pivotally journalled latching pin out of the ratchet wheel opening via a catch tab which is rigidly connected thereto. Subsequently, the catch tab slides back on the flat flank of the leaf spring to its starting position, so that the latching pin again bears against the outer face of the ratchet wheel until it enters the next latching opening of the ratchet wheel.

The bearing blocks for the armature and the latching pin as well as the clamping mount for the bimetal strip are preferably connected to a bearing plate for the strip shaft which is arranged inside the glass tube and which extends transversely of the longitudinal axis of the strip. The bearing blocks may be formed as lugs which are pressed out of the bearing plate.

The invention will now be described in detail with reference to the accompanying drawings, in which.

Figure 1:
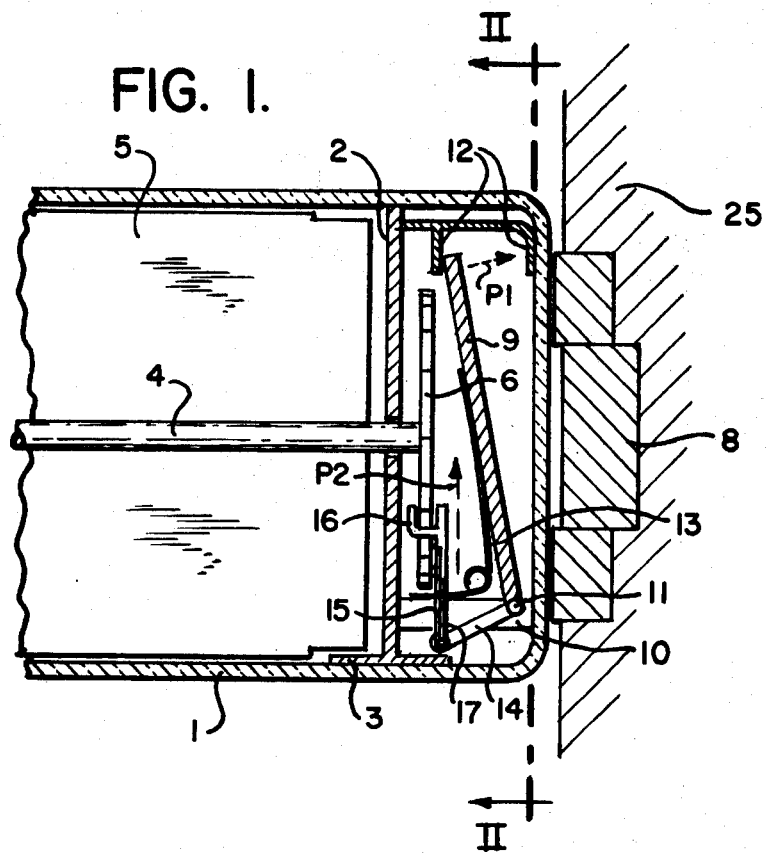
FIG. 1 is a longitudinal sectional view of the end of a tube provided with a sunshade strip, and a device for the rotation of the strip (for the sake of clarity, the means for latching of the rotation device has been omitted).

FIG. 1 shows an evacuated glass tube 1 in which transversely extending bearing plates 2 are arranged at the ends, each of said bearing plates resting against the inner wall of the glass tube 1 by way of three extensions 3 which extend at an angle with respect to the bearing plate (each Fig. shows only one bearing plate 2). The bearing plates 2 serve to accommodate a rotatable shaft 4 on which there is mounted a sunshade strip 5 which consists of a thin metal plate or a plastic plate. At the end of the shaft 4 there is mounted a ratchet wheel 6 which has sawteeth 7 which are situated at the same angular distance from one another on or at its circumference (FIG. 2).

On the end face of the glass tube 1 there is arranged an electric relay whose excitation coil 8 is situated outside the glass tube 1 and whose soft-iron armature 9 which co-operates with the excitation coil 8 is pivotally arranged inside the glass tube 1. For this purpose two lugs 10 are pressed out of the bearing plate 2 at right angles in order to serve as bearing blocks for the pivot spindle 11 of the armature 9. Two abutments 12 which are also mounted on the bearing plate 2 serve to limit the stroke of the armature 9. Between the armature 9 and one of its bearing blocks 10 there is provided a tension spring 13 which pulls the armature 9 away from the excitation coil 8. At the side of the pivot spindle of the armature 9 there is connected a lever 14, a pawl 15 being pivotally connected to the end of said lever. The fork-shaped end 16 of the pawl 15 bears on the edge of the ratchet wheel 6 and is pressed against the ratchet wheel 6 by means of a pressure spring 17.

When current is applied to the excitation coil 8, the armature 9 is attracted in the direction of the arrow P1. At the same time the pawl 15 is moved forwards in the direction of the arrow P2 via the lever 14, its end 16 then pressing against the steep flank of one of the sawteeth 7 of the ratchet wheel 6, thus rotating the ratchet wheel 6 forward over one tooth spacing. When the excitation of the relay is terminated, the armature 9 is pulled in the direction opposite the direction of the arrow P1 by the tension spring 13, the pawl 15 then sliding back on the flat flank of the next tooth until it drops onto the next sawtooth and is situated in front of the steep flank of the next tooth. Using a stepping mechanism of this kind, rotations of the ratchet wheel 6, and hence the sunshade strip 5, of up to 45° can be performed during each movement step. In the present embodiment, however, smaller angular rotations are performed.

Figure 2:
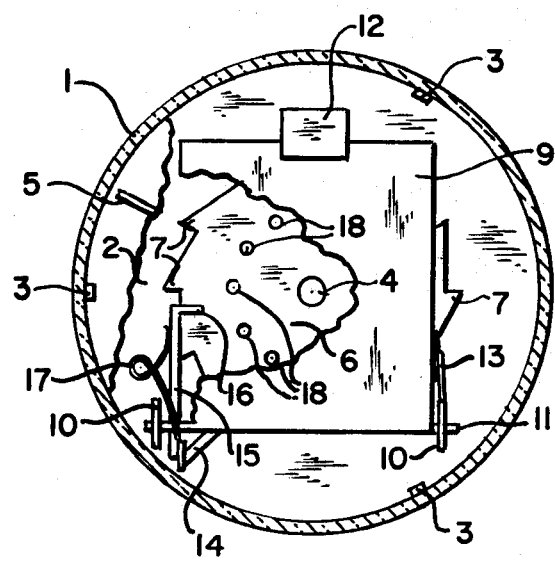
FIG. 2 is a cross-sectional view, taken along the line II—II of FIG. 1.
Figure 3:
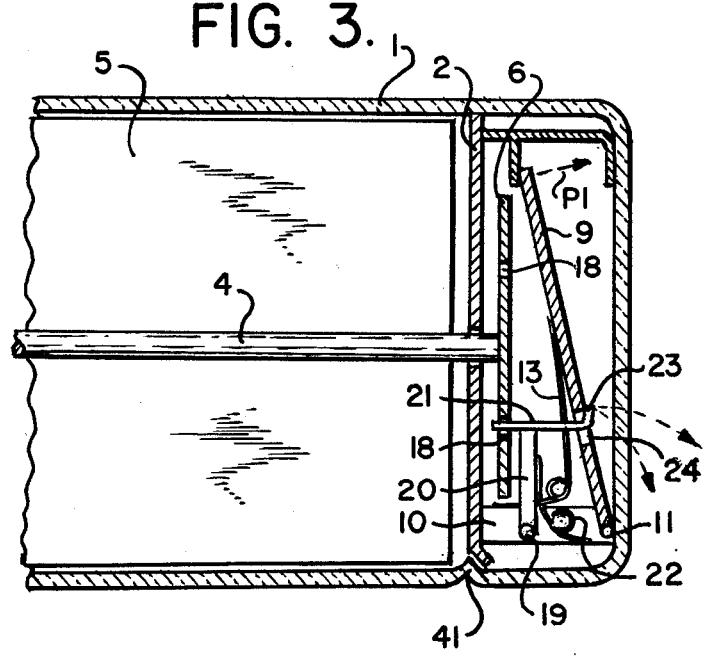
FIG. 3 is a longitudinal sectional view, corresponding to FIG. 1, of the tube showing the means for latching the rotation device shown in FIG. 1 (this device has been omitted for the sake of clarity).

FIG. 3 shows the latching means for the ratchet wheel 6 which has been omitted in the FIGS. 1 and 2 for the sake of clarity. The ratchet wheel 6 is formed on its outer face with openings 18 which are associated with the individual sawteeth and which are situated in a circle around the axis of the shaft 4. One of the bearing blocks 10 also includes a pivot 19 for a lever-like catch 20 of a latching pin 21 which extends essentially transversely of the ratchet wheel 6 and which is pressed against the ratchet wheel 6 in its rest position by means of a pressure spring 22, the pin thus entering one of the openings 18. The bent end 23 of the catch 20 engages in a recess 24 in the armature 9 as a latch. The recess 24 may be formed in the edge of the armature 9 by milling. During the movement of the armature 9 in the direction of the arrow P1, it pulls the latching pin 21 out of the relevant opening 18 by way of the bent end 23, the ratchet wheel 6 thus being released. Because the upper end (in the drawing) of the recess 24 follows a different path (denoted by a broken line) during the pivoting movement of the armature 9 than the end 23 (dot-dash arrow), the catch end 23 slides on the armature 9 in the direction of the pivot spindle 11 until its contacting edge enters the recess 24. The catch end 23 thus no longer engages the surface of the armature 9, so that the latching pin 21 is pressed against the outer face of the ratchet wheel 6 again by the pressure spring 22. The ratchet wheel 6 then slides past the contacting latching pin 21 until the pin enters the next opening 18, the rotary movement thus being blocked.

During the return movement of the armature 9 to its starting position opposite the direction of the arrow P1, the bent end 23 of the catch must again engage in and behind the recess 24 in the armature 9. During the return movement of the armature 9, however, its non-perforated part first engages the end 23 of the catch. However, when the upper part of the end 23 is bent to the side (out of the plane of the drawing) so far that its outer edge projects laterally beyond the edge of the armature 9 and when the pivot 19 is constructed so that it can yield slightly in the lateral direction, the returning armature 9 will press the end 23 aside until it enters the recess 24 of the armature 9. The end 23 subsequently snaps back into engagement with the armature 9 so that the latter is arrested in a latch-like manner. The device is then ready for the next movement step.

The described device may have a very compact construction consisting of only a few punched metal parts and springs. In a practical embodiment comprising a glass tube 1 having diameter of 65 mm, the thickness of the device from the bearing plate 2 to the outer abutment 12 amounted to only 10 mm.

A plurality of the described glass tubes 1 having sunshade strips 5 is paraxially, adjacently arranged in a frame 25 which is covered on each side with a glass pane in order to form a thermally insulating wall element. The excitation coils 8 of the relays are then mounted in the frame 25. Synchronization of the rotary movement of the sunshade strips 5 is achieved by the simultaneous excitation of the relays. Assuming a maximum power of a relay of 50 W, a group of 30 or more glass tubes can be simultaneously driven in a normal dwelling. In order to reduce the dimensions of the excitation coil 8, low-voltage operation with, for example, 20 V is advisable.

Figure 4:
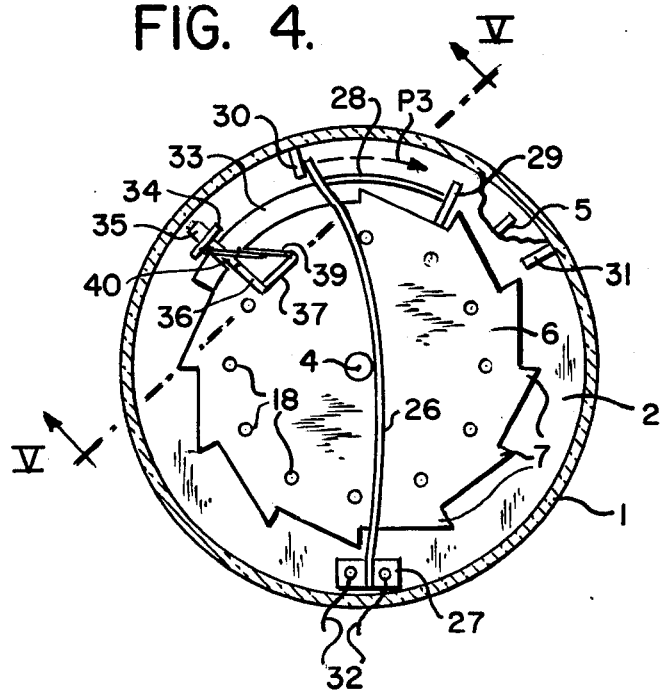
FIG. 4 is a cross-sectional view of a tube having a different device for the rotation and latching of the sunshade strip.
Figure 5:
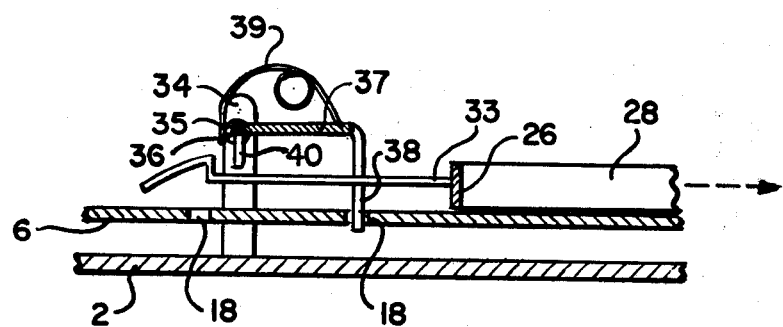
FIG. 5 is a sectional view on an enlarged scale taken along the line V—V of FIG. 4, of a part of the tube.
Figure 6:
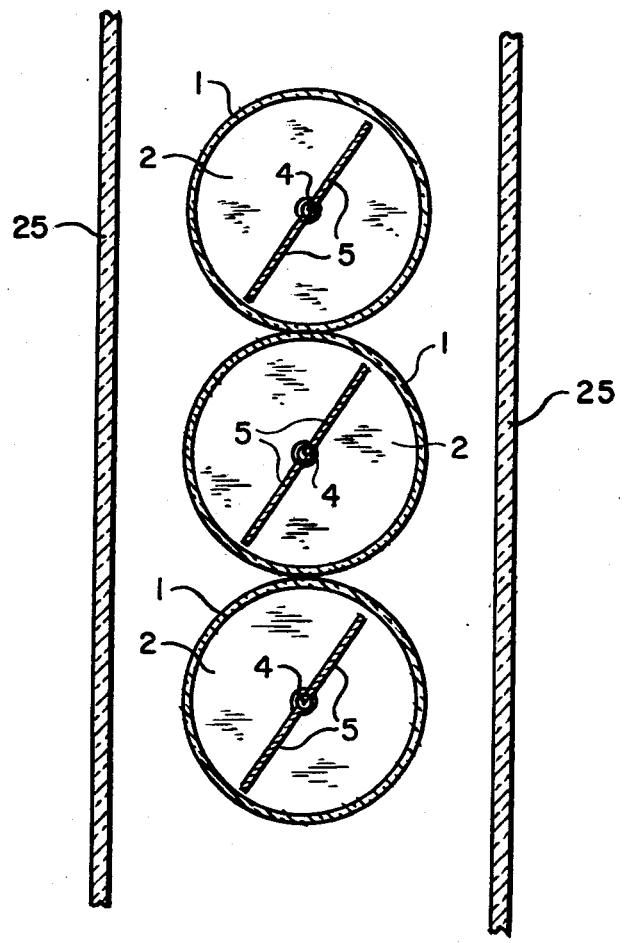
FIG. 6 is a partial cross-sectional view of a wall element in accordance with the invention.

The construction of the glass tube 1, the bearing plate 2, the shaft 4 with the sunshade strip 5 and the ratchet wheel 6 with the sawteeth 7 and the openings 18 of the device shown in FIGS. 4 and 5 corresponds to that shown in the FIGS. 1 to 3. The rotary movement of the ratchet wheel 6, however, is now performed by means of a bimetal strip 26 which is unilaterally clamped in a clamp 27 which is connected to the bearing plate 2 so that it can move adjacent and parallel to the ratchet wheel 6. Via a resilient lever 28, a pawl 29 is connected to the free end of the bimetal strip 26, said pawl resting on the circumference of the ratchet 6. In its rest position, the bimetal strip 26 bears against an abutment 30; it is moved towards an abutment 31 in the direction P3 when it is heated, the pawl ultimately abutting against said abutment. During this movement, the ratchet 6 is rotated one tooth spacing further. Cooling of the bimetal strip 26 causes the strip to return to the abutment 30, the pawl 29 on the resilient lever 28 then sliding back on the relevant tooth 7 in order to drop behind the next tooth. The device is then ready again for the next movement step. For the direct heating of the bimetal strip 26 electric power supply wires 32 are connected thereto which are fed out of the glass tube 1 in a vacuum-tight manner.

On the side of the bimetal strip 26 which is remote from the pawl 29 there is provided a leaf spring 33 whose end is bent to be sawtooth-shaped and whose wide surface moves parallel to the outer end face of the ratchet wheel 6 (FIG. 5). A bearing 35 is mounted in a bearing block 34 which is also pressed out of the bearing plate 2 as a lug, the longitudinal axis of said bearing extending parallel to the ratchet wheel 6 and approximately radially with respect to the shaft 4. A wire-shaped catch 36 is rotatably accommodated in the bearing 35, the catch being bent at right angles 37, after which it changes over into a latching pin 38 which is bent 90° transversely of the ratchet wheel 6, and which enters the openings 18 of the wheel 6. Via the latching pin 38, the catch 36, 37 is pulled against the ratchet wheel 6 by a tension spring 39.

During standstill of the ratchet wheel 6, it is blocked by the latching pin 38 which has entered an opening 18. During movement of the bimetal strip 26 in the direction of the arrow P3, the Z-shaped end of the leaf spring 33 rotates a tab 40 which is connected to the catch 36, thus pulling the latching pin 38 out of the opening 18. When the bimetal strip 26 is moved further in the direction of the arrow, the tab 40 is released again, so that the catch 36, 37 can return to its original position, the latching pin 38 then bearing against the outer face of the ratchet wheel 6. The ratchet wheel 6 first slides past the latching pin 38 until the latter enters the next opening 18 at the end of the movement step. The catch tab 40 has thus also reached its starting position again. During the return movement of the bimetal strip 26 opposite the direction of the arrow P3, the leaf spring 33 is deflected downwards with respect to the catch tab 40 and ultimately springs back to the position shown in FIG. 5.

The bimetal strip 26 may be shaped as a U or a double U. In the case of the double U-shape, an electrically insulating clamping connection must also be provided at its free end. With a double U-shaped bimetal strip having a thickness of 0.5 mm a length of 50 mm and a width of 2.5 mm for each limb, an adequate movement step can be performed with an electric power of approximately 5 W (1 V, 5 A). The bimetal strip 26 is then heated approximately 100° K. it takes approximately 30 seconds before the pawl 29 reaches the abutment 31. The cooling time amounts to approximately 60 seconds.

The passage of the power supply wires 32 through the glass tube 1 can be constructed like the pinch of an incandescent lamp. The end of the glass tube may then be provided with a holder which fits in a socket formed in the frame of the wall element.

For reliable holding of the bearing plate 2 in the glass tube, protrusions 41 (FIG. 3) can be impressed in three positions which are uniformly distributed along its circumference. The bearing plate 2 then has three corresponding recesses at its periphery. During mounting, the bearing plate 2 is slid into the glass tube 1 so far that the glass protrusions 41 enter the recesses in the bearing plate 2. Subsequently, the bearing plate 2 is rotated about its axis, so that it is situated behind the glass protrusions 41.

What is claimed is:

1. A thermally insulating transparent wall element, which comprises a plurality of paraxially, adjacently arranged evacuated transparent tubes; a shaft arranged axially in each transparent tube and journalled therewithin; an elongate sunshade strip mounted on each shaft; a ratchet wheel supported on one end of each shaft and having at its circumference engaging elements situated at the same angular distance from one another; an externally operable pawl cooperating with the engaging elements of the ratchet wheel to advance the same in step-wise manner; means to drive the pawl; and a member coupled to the pawl drive means for latching the ratchet wheel at the end of each movement step, said member being releasable from the ratchet wheel by said pawl drive means just before the start of the next movement step.

2. A wall element according to claim 1, in which the engaging elements of the ratchet wheel comprise sawteeth.

3. A wall element according to claim 1, in which the ratchet wheel is provided with openings respectively associated with the engaging elements, said openings being arranged in a circle around the axis of the transparent tube, and the latching member comprises a latching pin pressed against the outer face of the ratchet wheel by a spring, said latching pin entering one of said openings at the end of each movement step and being released from said opening just before the start of the next movement step.

4. A wall element according to claim 3, in which the pawl drive means comprises a relay including a spring-loaded armature pivotally mounted inside the transparent tube, an excitation coil situated outside the transparent tube, and a lever pivotally connecting the armature to the pawl.

5. A wall element according to claim 4, in which the latching pin is pivotally mounted, its end remote from the ratchet wheel being engageable in a recess provided in the armature.

6. A wall element according to claim 5, which includes a bearing plate for journalling the end of the axial shaft, and bearing blocks attached to said bearing plate for pivotally mounting the armature and the latching pin.

7. A wall element according to claim 3, in which the pawl drive means comprises a bimetal strip mounted at one end inside the transparent tube adjacent the ratchet wheel so as to be movable parallel thereto, the pawl being mounted on the other end of said bimetal strip, and means for controllably heating the bimetal strip to effect movement thereof.

8. A wall element according to claim 7, in which the latching pin is pivotally mounted, and a leaf spring is also mounted on the other end of the bimetal strip, the free end of the leaf spring being sawtooth-shaped, the wide surface of said leaf spring moving parallel to the ratchet wheel for release of the latching pin from the ratchet wheel opening.

9. A wall element according to claim 8, which includes a bearing plate for journalling the end of the axial shaft, and a clamp attached to said bearing plate for clamping said one end of the bimetal strip.

* * * * *